Aug. 23, 1966    D. W. PENDLETON    3,268,813
METER CIRCUITS WITH MULTIPLE INCREMENTS OF DIFFERENT SLOPES
Filed March 22, 1962                    2 Sheets-Sheet 1

INVENTOR.
DAVID W. PENDLETON
BY
Alexander & Dowell
ATTORNEYS

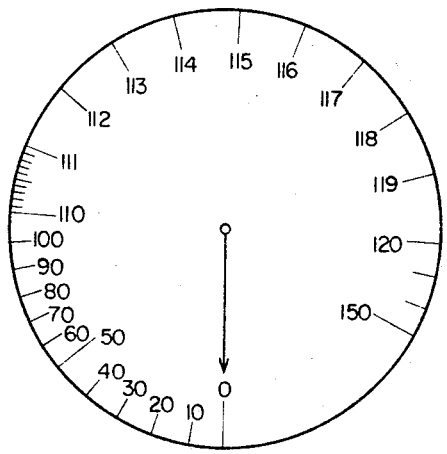
Fig. 7
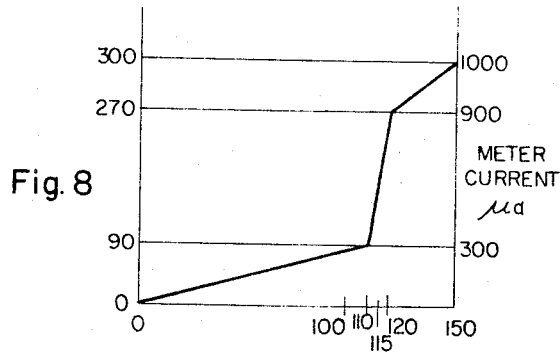
Fig. 8
| VOLTS INPUT AT E | VOLTAGE DROP A | VOLTAGE DROP B | VOLTAGE AT C | CURRENT THRU R7 | CURRENT THRU R6 | METER CURRENT |
|---|---|---|---|---|---|---|
| 110 | 2.5 | 2.5 | 107.5 | 300μa | 300μa | 300μa |
| 120 | 7.5 | 7.5 | 112.5 | 900μa | 300μa | 900μa |
| 150 | 36.7 | 8.3 | 112.5 | 4420μa | 300μa | 1000μa |
Fig. 9

United States Patent Office 3,268,813
Patented August 23, 1966

3,268,813
METER CIRCUITS WITH MULTIPLE INCREMENTS
OF DIFFERENT SLOPES
David W. Pendleton, Alexandria, Va., assignor to American Machine & Foundry Company, a corporation of New York
Filed Mar. 22, 1962, Ser. No. 181,730
5 Claims. (Cl. 324—132)

This invention relates to D.C. meter circuits, and more particularly relates to voltage-measuring meters having on their characteristic curves of displacement versus input voltage plural linear increments of different slopes intersecting at sharply defined crossover points.

It is the principal object of this invention to provide a meter circuit including a D.C. galvanometer-type meter having a displacement characteristic which is substantially linear in all meter positions, and the circuit providing a different composite characteristic including plural linear slopes which are different in one sector of the meter than in another sector, and wherein these increments of different slope in the measuring characteristic are mutually joined at sharply defined knees.

It is a very important object of the present invention to provide a meter circuit in which an ordinary substantially linear galvanometer can be used to provide readings which are expanded in one increment but compressed in other increments of the over-all meter displacement characteristic, the external circuitry shifting the slope of the meter characteristic automatically at one or more knees along the characteristic by using electronic circuit components which change from conductive to non-conductive depending upon the voltage across them, these components comprising Zener voltage regulating elements. Although meter circuits operating on similar principles have been known in the prior art using VR gas-filled regulator tubes, these circuits were not practical for making accurative quantitative measurements because of the fact that there is a wide spread between the voltage at which a VR tube breaks down and the voltage at which it extinguishes, so that the measurements are different depending upon whether they are approached from above or below the final reading.

The prior art contains many other types of circuits providing expanded scale characteristics, many using a suppressed zero feature. A typical meter circuit of this type may include a meter calibrated about a center reading of 120 volts and having a maximum reading of 130 volts and a minimum reading of 110 volts on the meter face scale. However, in a meter of this type once the pointer moves off scale outside of the 110–130 volt calibration, there is nothing to indicate the approximate value of the voltage which is being measured, and the meter shows only that it is outside of the narrow range covered by its calibration.

It is the purpose of the present invention to provide a meter having a highly expanded linear increment of calibrations symmetrically disposed about a selected nominal meter reading which is chosen according to the service to which the meter is to be put, and this meter also having one or more relatively compressed increments of calibration, for instance covering values between zero and the lower end of the expanded scale increment, and/or covering values between the upper end of the expanded scale increment and a full-scale meter reading. This invention is illustrated and described in terms of specific embodiments of meter circuits designed to be used on a power line having a nominal voltage of 115 volts, and the meter having an expanded scale including values above and below this nominal value, and having compressed scale increments for showing values of voltage lying outside of the expanded portion of the scale. One of these illustrative embodiments also includes the combination of a D.C. galvanometer with rectifier means for converting alternating current input to direct current to actuate the galvanometer and meter circuitry which determines the positions of the knees at which the various different linear slopes of the circuit characteristic meet one another.

Basically, these circuits comprise impedances connected in series and parallel combinations in the meter circuit and controlled by Zener diodes which remain non-conductive as long as the voltage across the Zener diode is below the Zener breakdown voltage, but which switch over and become conductive as soon as the voltage thereacross exceeds the Zener breakdown voltage, thereby in effect varying the proportionality impedances appearing in the meter circuit and so changing the slope of the meter characteristic by effectively switching the values of these impedances for different input voltages to the circuit.

Other objects and advantages of this invention will become apparent during the following discussion of the drawings, wherein:

FIG. 7 is a view of a suitable face scale to be used on the D.C. galvanometer employed in the circuit of FIG. 6;

FIG. 8 is a graphical illustration of the three slopes of the meter circuit characteristic showing these slopes joined together at two knees; and FIG. 9 is a table of voltage values appearing at correspondingly marked points in the circuit of FIG. 6 but showing the action of the circuit when the two knees of its characteristic slope are reached.

Figure 1:
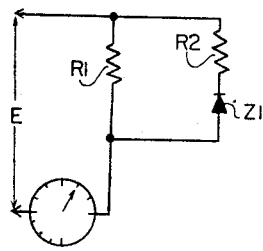
FIG. 1 is a schematic diagram illustrating a circuit according to the present invention for providing a meter having a dual-slope characteristic scale.
Figure 2:
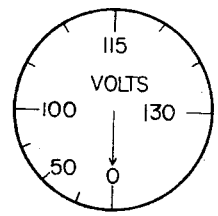
FIG. 2 is a front view of a suitable meter face showing calibrations which are suitable when the meter circuit of FIG. 1 is used to measure the voltage on a power line having a nominal center voltage of 115 volts.

Referring now in detail to the drawings, FIGS. 1 and 2 illustrate a meter circuit and a face for a meter which perform according to the present invention. The meter employed is of a type having a 270-degree rotation of the pointer for full-scale reading, the meter having a 1,000-microampere D.C. movement. In the specific embodiment shown in FIGS. 1 and 2, it is desired to compress the lower voltage readings of the meter, for instance from zero to 100 volts, into the first 90 degrees of the meter rotation, and then to expand the increment of the scale covering the higher meter readings of principal interest, for instance from 100 to 130 volts, over the last 180 degrees of the pointer rotation. For this purpose, the resistance R1 should be 300,000 ohms, and R2 should be 53,000 ohms. If the nominal power-line voltage is 115 volts, the pointer will read straight up on its scale for this nominal value and will operate on an expanded scale basis ranging from 90 degrees to 270 degrees of the meter face in expressing voltage readings between 100 and 130 volts. The advantage of having the compressed calibrations go to zero at the lower end of this scale is that if the voltage on the line is low, it is possible to read within the first 90 degrees of meter rotation approximately the correct voltage existing at that time, which readings can not be had on the usual type of suppressed zero meter. The curve of a dual-scale meter having two linear slopes in its operating characteristic is graphically illustrated in FIG. 3 which indicates the input voltage and meter current versus the angular displacement of the meter pointer.

The circuit values for the circuit of FIG. 1 are determined as follows. The resistor R1 should have a value selected to allow one-third full-scale meter current to flow at 100 volts input. In this event $$R1 = E/I = 100 \text{ volts}/333 \text{ microamperes} = 300,000 \text{ ohms}$$

Figure 3:
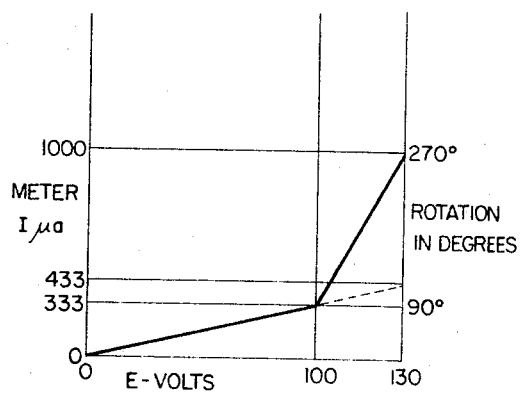
FIG. 3 is a graphical illustration of the two slopes of the meter circuit joined at a knee in the characteristic occurring when the input to the circuit is 100 volts.

A Zener diode Z1 having a 100-volt breakdown voltage is selected and employed in such a way that when the voltage across R1 has risen to 100 volts, the Zener diode Z1 also experiences a substantially 100-volt drop thereacross and breaks down so as to draw current through R2. Incidentally, after having broken down at 100 volts, the Zener diode Z1 maintains a 100-volt drop thereacross as long as the voltage E across the input to the circuit is greater than 100 volts. Now assuming the full-scale reading is to be 130 volts or 1,000 microamperes, at this voltage the current through R1 will be 130/300,000 or 433 microamperes, and therefore the current which must flow through the resistance R2 and through the Zener diode will be 1,000 minus 433, or 567 microamperes. Further, remembering that the voltage drop across the Zener diode Z1 will be 100 volts, a 30-volt drop must then appear across the resistance R2, and therefore the value of this resistance should be $30/567 \times 10^{-6}$, or 53,000 ohms. Thus, this circuit provides a two-slope characteristic as illustrated in FIG. 3.

Figure 4:
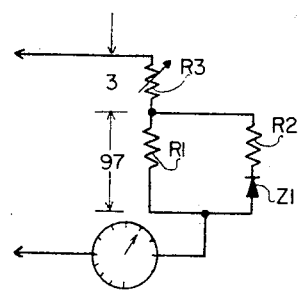
FIG. 4 is a schematic diagram similar to FIG. 1 but showing a circuit provided with an adjustable resistance by which the circuit can be compensated to correct for a Zener diode having an actual breakdown voltage below the nominal voltage at the knee of the circuit characteristic.

Referring now to FIG. 4, because of the fact that Zener diodes have production tolerances so that they do not break down at exactly the nominal value assumed herein of 100 volts, some means of adjustment should be provided in the circuit so that a wider range of Zener regulating elements can be used on a production basis. In FIG. 4, a suitable means is shown if the actual breakdown voltage of a Zener diode is somewhat below its nominal value. By placing in series an additional resistance $R_3$ between the input terminal of the circuit and the resistances R1 and R2, the voltage appearing across the Zener diode, assuming that it actually breaks down at 97 volts instead of 100 volts, can be corrected so that the diode will conduct for a 100-volt input to the circuit by properly adjusting the series resistance R3. In this way a voltage divider R1, R3 is provided which presents a voltage drop of 97 volts across the Zener diode when the input voltage is in fact 100 volts. Thus the error of the Zener diode can be compensated provided, however, that the error is on the low side of the breakdown voltage of the Zener diode rather than on the high side.

Figure 5:
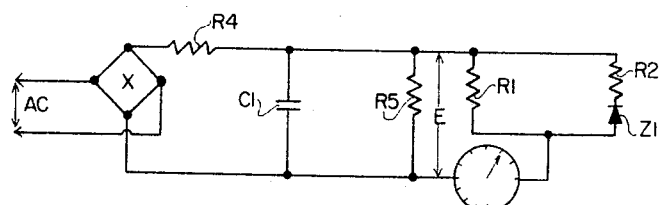
FIG. 5 is a schematic diagram of a meter circuit according to the present invention provided with an input rectifier so that it can be used to make measurements of alternating current.

FIG. 5 shows a circuit of the type illustrated in FIG. 1 connected with a suitable meter rectifier bridge X so as to translate an A.C. input voltage to the bridge into a filtered D.C. voltage, thus establishing across the circuit at the point E, a D.C. voltage varying between zero and the full-scale reading of the meter. A series resistance R4, or choke, cooperates with a capacitor C1 and a load resistance R5 to provide a filtered and smoothed D.C. component to the meter circuit which is otherwise the same as that shown in FIG. 1. Alternatively in this circuit a resistor could be inserted in series between the resistances R5 and R1 and corresponding with the resistor R3 in FIG. 4 for the purpose of compensating for Zener diodes having too low a breakdown voltage. The circuit of FIG. 5 has the rather inobvious advantage that a Zener diode having a breakdown voltage above the selected 100-volt value can also be used, because of the fact that the direct-current output voltage of the filter comprising the series resistor R4 and the bleeder resistor R5 can be adjusted, for example, to 103 volts, when the A.C. input voltage is exactly 100 volts R.M.S.

Figure 6:
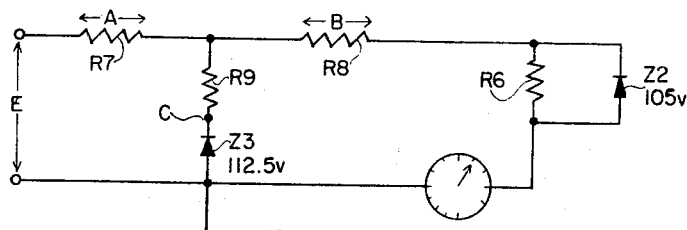
FIG. 6 is a schematic diagram of a meter circuit having three linear increments having different slopes and mutually joined together at two knees, thereby providing a meter which shows a compressed increment from zero to 110 volts, an expanded increment of the scale from 110 volts to 120 volts covering half of the entire meter displacement, and a compressed increment from 120 to 150 volts.

Referring to FIG. 6, a more sophisticated circuit is illustrated which provides a measuring characteristic having three linear increments having different slopes and mutually intersecting at two well-defined knees as illustrated in FIG. 8. Again, in this example, a meter is used having a greater angular rotation of the pointer than the usual 90° meter, the present meter having a 300° sector of pointer rotation. This unusual type of meter is, however, helpful when used in connection with the present invention and provides easier-to-read expanded-scale indications included within 300° of pointer displacement.

In the meter circuit illustrated in FIG. 1, a two-range meter is illustrated having an expanded scale between 100 and 130 volts, but indicating lesser voltage all the way down to zero. In some applications, variations in line voltages can exceed the value of 130 volts at the upper end of the scale and therefore the embodiment illustrated in FIGS. 6, 7 and 8 is designed to indicate low-voltage values on a compressed scale of voltages between 0 and 110 volts, to expand the range between 110 and 120 volts over an arc of 180° of the meter face, and then to provide a compressed scale of voltage values between 120 and 150 volts, and in this embodiment all three of these ranges are linear.

Assuming again that the meter has a 1000 microampere movement and that the face of the meter is calibrated as shown in FIG. 7, then for various values of input voltage, specifically for voltages of 110, 120 and 150, the voltages which must appear at selected marked points in the circuit in FIG. 6 are as shown in the table of FIG. 9. Assuming an input voltage of 110 volts the values of the resistances and of the Zener diodes breakdown voltages are such that the Zener diode Z2 is on the verge of conduction. In the numerical example presented herein the Zener diode Z2 has a breakdown voltage of 105 volts and the Zener diode Z3 has a breakdown voltage of 112.5 volts. Since the meter scale is linear, and since the pointer rotation should be 90° in order to reach the 110-voltage calibration on the scale at the first knee, a meter current of 300 microamperes is necessary and therefore the combined sum of the resistances R6, R7 and R8, assuming that neither Zener diode is actually conducting, must be equal to $110/300 \times 10^{-6}$ or 366,600 ohms. Moreover, since it is necessary that the Zener diode Z2 begin conducting at 105 volts, and since we assume that at 110 volts input the Zener diode Z2 is at the point of conductivity, R6 must be equal to 105 divided by $300 \times 10^{-6}$, which is 350,000 ohms. Having established R6, it then follows by simple arithmetic that R7 plus R8 is equal to 16,600 ohms.

Assuming now an input of 120 volts the voltage across the Zener diode Z3 in series with the resistance R9 must be raised to 112.5 volts in order to bring the Zener diode Z3 to the verge of conduction. Therefore, the voltage across the resistance R8 would have to be 7.5 volts in order for 112.5 volts to appear across the Zener diode Z3, and 105 volts to appear across the Zener diode Z2. Moreover, it is known that when the meter is reading 120 volts on the scale, 900 microamperes will be flowing through the meter, and therefore the value of R8 equals 7.5 divided by $900 \times 10^{-6}$ which equals 8,300 ohms. Since R7 plus R8 is equal to 16,600 ohms and R8 equals 8,300 ohms, then R7 must also equal 8,300 ohms.

We have now established the resistance values for R7, R8 and R6, and it only remains to establish the resistance value for R9. This can be done by assuming that the meter is reading full-scale with 150 volts input and with 1,000 microamperes through the meter. Since 1,000 microamperes are passing through the resistance R8 which is 8,300 ohms, the voltage drop across this resistance must be 8.3 volts. It is already known that the voltage drop across the Zener diode Z2 is 105 volts, and therefore the voltage at the junction of the resistances R7, R8 and R9 must be 113.3 volts. In order to establish the voltage at this junction the drop across the resistance R7 must be 36.7 volts. It therefore follows that the current through the resistance R7 is 36.7 divided by 8,300 or 4,420 microamperes. Of this total current, 1000 microamperes flows through the meter circuit including the resistance R8, and therefore 3420 microamperes must flow through the resistance R9. The voltage across the resistance R9 must be 150 volts minus 112.5 volts minus 36.7 volts, or a total of 0.8 volts. Again employing ohm's law the resistance R9 is therefore $.8/3420 \times 10^{-6}$ which equals 333 ohms. In this manner, all of the resistance values have been established for the example illustrated in FIG. 6, and it has been demonstrated that the slopes for the characteristic curve of the meter circuit of FIG. 6, as illustrated in FIG. 8, can be established using reasonable resistance values and currents, a common one-milliampere meter, and Zener diodes having commercially available values.

In all of the electrical circuits disclosed in the present invention, the Zener diodes act as switches which turn on or off the flow of current in resistor circuits connected in series therewith; but these diodes differ from switches because once turned on, they hold a constant voltage drop thereacross in a manner well known to those skilled in the art.

This invention is not to be limited to the illustrative examples shown in the drawings, for obviously changes may be made within the scope of the following claims.

I claim:

1. A meter circuit having a response curve of meter displacement versus potential applied to the input terminals of the circuit which curve includes three linear increments having different slopes in adjacent increments which mutually intersect at sharply defined knees, comprising a D.C. meter connected in a series circuit between the terminals; a first multiplying resistance connected in said series circuit between the meter and a terminal and partially determining the slope of its response curve in one of said increments; a voltage sensitive circuit connected in shunt with said first multiplying resistance and comprising a first Zener voltage regulating element which becomes conductive substantially at the crossover voltage of the first knee of the curve; a second multiplying resistance including a resistor connected in said series circuit between one input terminal and the meter; and a second Zener voltage regulating element connected from the end of the said resistor nearest the meter to the input terminal on the other side of the meter and having a Zener breakdown voltage different from the voltage of the first Zener element.

2. In a circuit as set forth in claim 1, the second multiplying resistance comprising the said resistor and another resistor connected in series, and the second Zener element being connected to the junction of said resistors through a current limiting resistor and having a higher breakdown voltage than the first Zener element.

3. In a circuit as set forth in claim 2, the breakdown voltage of the first Zener element equaling the terminal voltage at the first knee minus the voltage drop across the second multiplying resistance, and the breakdown voltage of the second Zener element equaling the terminal voltage at the second knee minus the voltage drop across the said resistor of the second multiplying resistance and the drop across said current limiting resistor.

4. A meter circuit having a response curve of meter displacement versus potential applied to input terminals of the circuit which curve includes multiple linear increments having different slopes in adjacent pairs of increments each of which adjacent pairs intersects at a sharply defined knee, comprising a D.C. meter having calibrations representing said adjacent increments of different slopes; at least one multiplying resistance connected in series between the input terminals and the meter and determining the slope of its response curve in one of said increments; a voltage sensitive circuit connected in shunt with said at least one multiplying resistance but in series with the meter and the input terminals and comprising a Zener voltage regulating element selected to become conductive at a nominal crossover voltage corresponding with a knee of the curve to thereby determine the slope of a different increment but wherein the actual breakdown voltage of the Zener element is below the crossover voltage; and means for compensating the meter circuit for the difference in voltage between the actual breakdown voltage and the said crossover voltage comprising a compensating resistor connected in series with said multiplying resistance and with said shunt-connected voltage sensitive circuit, the value of the compensating resistance being equal to said difference voltage divided by the current through the circuit when the meter is displaced to its calibration representing said knee.

5. An A.C. potential-measuring circuit including input terminals and including a meter circuit having a response curve of meter displacement versus potential applied to the meter circuit which curve includes multiple linear increments having different slopes in adjacent pairs of increments each of which adjacent pairs intersects at a sharply defined knee, the meter circuit comprising a D.C. meter calibrated in terms of said adjacent increments of different slopes; at least one multiplying resistance connected in series between the input terminals and the meter and determining the slope of its response curve in one of said increments; a voltage sensitive circuit connected in shunt with said at least one multiplying resistance but in series with the meter and the input terminals and comprising a Zener voltage regulating element selected to become conductive at a nominal crossover voltage corresponding with a knee of the curve to thereby determine the slope of a different increment but wherein the actual breakdown voltage of the Zener element is above the selected crossover voltage; and means for compensating the potential-measuring circuit for the difference in voltage between the actual breakdown voltage and the said crossover voltage, comprising the combination of an A.C.-to-D.C. translating means connected into an integrating filter circuit and interposed between the input terminals and the meter circuit, the filter circuit comprising series and shunt resistors proportioned to deliver to the meter circuit a D.C. potential equal in numerical value to the R.M.S. potential plus the amount of said difference voltage.

References Cited by the Examiner
UNITED STATES PATENTS 2,284,423　5/1942　Hansell _____ 324—132
2,842,733　7/1958　Lilienstein _____ 324—132

FOREIGN PATENTS 780,118　7/1957　Great Britain.
861,582　2/1961　Great Britain.

WALTER L. CARLSON, *Primary Examiner.*

FREDERICK M. STRADER, *Examiner.*

R. V. ROLINEC, *Assistant Examiner.*